United States Patent
Falk et al.

(10) Patent No.: US 11,159,492 B2
(45) Date of Patent: Oct. 26, 2021

(54) APPARATUS AND METHOD FOR ADAPTING AUTHORIZATION INFORMATION FOR A TERMINAL

(71) Applicant: SIEMENS AKTIENGESELLSCHAFT, Munich (DE)

(72) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/350,138

(22) Filed: Nov. 14, 2016

(65) Prior Publication Data

US 2017/0149744 A1 May 25, 2017

(30) Foreign Application Priority Data

Nov. 23, 2015 (DE) .......................... 102015223078.3

(51) Int. Cl.
*H04L 29/06* (2006.01)
*H04L 12/46* (2006.01)
*H04L 29/08* (2006.01)

(52) U.S. Cl.
CPC ...... *H04L 63/0428* (2013.01); *H04L 12/4641* (2013.01); *H04L 63/06* (2013.01);
(Continued)

(58) Field of Classification Search
CPC . H04L 12/4641; H04L 63/0428; H04L 63/06; H04L 63/0876; H04L 63/166;
(Continued)

(56) References Cited

U.S. PATENT DOCUMENTS 6,978,298 B1 * 12/2005 Kuehr-McLaren ..........................
H04L 67/1095
709/223
7,134,024 B1 * 11/2006 Binding ................ H04L 9/3234
713/187

(Continued)

FOREIGN PATENT DOCUMENTS

| CN | 103593603 A | 2/2014 |
|---|---|---|
| CN | 104541489 A | 4/2015 |
| CN | 104838629 A | 8/2015 |

OTHER PUBLICATIONS

Budesamt für Sicherheit in der Informationstechnik: "Überblickspapier Netzzugangskontrolle", XP055338864, Gefunden im Internet: URL:https://www.bsi.bund.de/SharedDocs/Downloads/DE/BSI/Grundschutz/Download/UeberblickspapierNetzzugangskontrolle.pdf?_blob=publicationFile [retreived Jan. 24, 2017] 2011.

(Continued)

*Primary Examiner* — Mohammad A Siddiqi
(74) *Attorney, Agent, or Firm* — Schmeiser, Olsen & Watts LLP

(57) ABSTRACT

An apparatus for adapting authorization information for a terminal is provided. The apparatus has a communication unit for communicating with the terminal, the communication unit being configured to carry out the communication as a test communication using an encryption protocol, a checking unit for checking a configuration of the encryption protocol on the terminal, and a control unit for adapting the authorization information for the terminal on the basis of a result of the check. A corresponding method for adapting authorization information for a terminal is also proposed. The proposed apparatus makes it possible to check the options supported by a terminal in an encryption protocol. In this case, the check can be carried out, in particular, using an (Continued)

encrypted communication connection which could not be monitored by a firewall.

19 Claims, 2 Drawing Sheets

(52) U.S. Cl.
CPC ........ H04L 63/0876 (2013.01); H04L 63/166 (2013.01); H04L 63/20 (2013.01); H04L 67/10 (2013.01); H04L 67/34 (2013.01); H04L 63/08 (2013.01); *H04L 2463/101* (2013.01)

(58) Field of Classification Search
CPC ......... H04L 67/10; H04L 67/34; H04L 63/20; H04L 63/08; H04L 2463/101
See application file for complete search history.

(56) References Cited

U.S. PATENT DOCUMENTS

| | | | | |
|---|---|---|---|---|
| 9,762,611 | B2* | 9/2017 | Wallace | H04L 63/1466 |
| 2003/0058801 | A1* | 3/2003 | Moore | H04J 3/14 |
| | | | | 370/250 |
| 2003/0063742 | A1* | 4/2003 | Neufeld | H04L 9/0662 |
| | | | | 380/46 |
| 2003/0088664 | A1* | 5/2003 | Hannel | H04L 29/06 |
| | | | | 709/224 |
| 2003/0200431 | A1* | 10/2003 | Stirbu | H04L 9/321 |
| | | | | 713/168 |
| 2004/0033814 | A1* | 2/2004 | Azuma | H04M 1/72519 |
| | | | | 455/558 |
| 2006/0095767 | A1* | 5/2006 | Krishnamurthi | H04L 63/166 |
| | | | | 713/168 |
| 2007/0157286 | A1 | 7/2007 | Singh et al. | |
| 2010/0223455 | A1* | 9/2010 | Ata | H04L 47/2441 |
| | | | | 713/150 |
| 2011/0238977 | A1* | 9/2011 | Talbert | G06F 19/3406 |
| | | | | 713/150 |
| 2013/0096998 | A1 | 4/2013 | Raleigh | |
| 2013/0283094 | A1* | 10/2013 | Baptist | H04L 67/1097 |
| | | | | 714/6.2 |
| 2014/0052975 | A1 | 2/2014 | Rodgers et al. | |
| 2014/0067996 | A1* | 3/2014 | Zhang | H04L 63/0428 |
| | | | | 709/217 |
| 2014/0082419 | A1* | 3/2014 | Untinen | H04L 43/18 |
| | | | | 714/27 |
| 2014/0304499 | A1* | 10/2014 | Gopinath | H04L 63/168 |
| | | | | 713/151 |
| 2015/0058917 | A1 | 2/2015 | Xu | |
| 2015/0229608 | A1 | 8/2015 | Schulz et al. | |
| 2015/0261966 | A1* | 9/2015 | Mensch | G06F 21/57 |
| | | | | 713/189 |
| 2016/0189147 | A1 | 6/2016 | Vanczak | |
| 2016/0226827 | A1* | 8/2016 | Bohannon | H04L 63/061 |
| 2018/0351921 | A1* | 12/2018 | Sharifi Mehr | H04L 9/14 |

OTHER PUBLICATIONS

Nispel Markus: "Grundlagen zur Kombination von NAC-und SIEM-Lösungen Was leisten Netzwerk-Zugangskontrolle und Security-Event-Management gemeinsam?", pp. 1-8, XP055338883, URL:http://files.vogel.de/vogelonline/pdfarticles/122/2/122290.pdf [retrieved am Jan. 25, 2017]; 2008.

Hardy G. Mark: "Interested in learning more about security? The Critical Security controls: What's NAC Got to Do with IT?", pp. 1-21, XP055338893, URL:https://www.sans.org/reading-room/whitepapers/analyst/critical-security-controls-what-039-s-nac-it-35115 [retrieved Jan. 25, 2017] 2013.

OWASP Testing Project: "Testing for Wak SSL/TLS Ciphers/Protocols/Keys vulnerabilties"; https://www.owasp.org/images/1/19/0TGv4.pdf, OTGv4.pdf, OWASP Testing Project, Sep. 17, 2014.

* cited by examiner

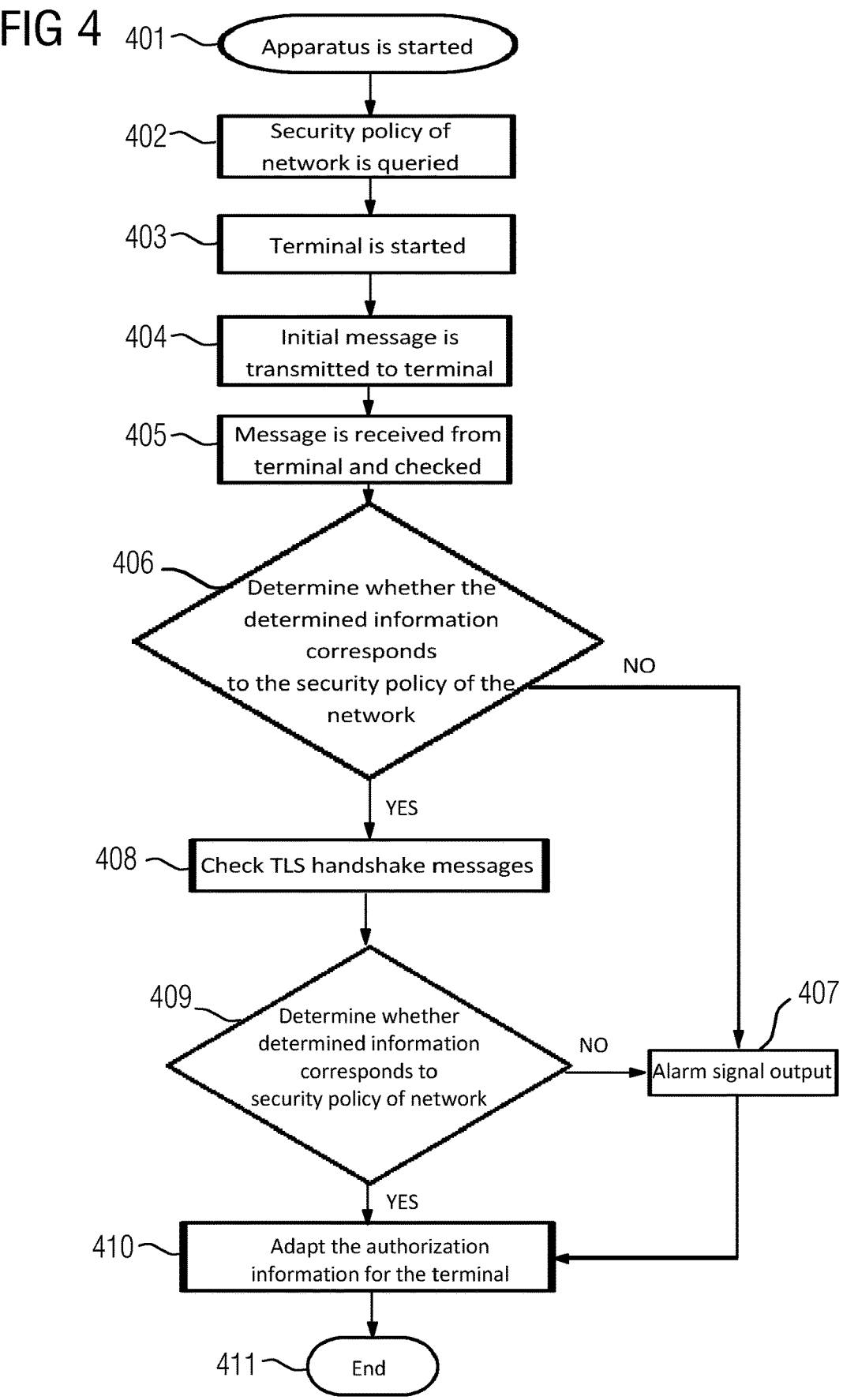

APPARATUS AND METHOD FOR ADAPTING AUTHORIZATION INFORMATION FOR A TERMINAL

CROSS-REFERENCE TO RELATED APPLICATION

This application claims priority to German Application No. 102015223078.3 having a filing date of Nov. 23, 2015 the entire contents of which are hereby incorporated by reference.

FIELD OF TECHNOLOGY

The following relates to an apparatus for adapting authorization information for a terminal. The following also relates to a network system having at least one terminal and at least one apparatus of this type. In addition, embodiments of the invention relate to a method for adapting authorization information for a terminal.

BACKGROUND

Security protocols for authentication and key agreement are used to authenticate communication partners and to agree on a cryptographic session key for cryptographically protecting subsequently transmitted useful data. Authentication may be carried out in this case on one side or both sides or may possibly even be dispensed with, in which case the communication partners communicate with one another without authentication or anonymously.

A common cipher suite which defines an option which can be used to cryptographically protect the useful data is often negotiated. This can define, for example, a cryptographic algorithm, a key length, an operating mode of a block cipher or further security services, for example message integrity. In this case, certificate-based authentication in which a digital certificate has to be checked is often used. Protocols used in practice, such as SSL, TLS, IKEv2, support a multiplicity of options for authentication and key agreement using cipher suites.

Since cipher suites are widely supported, however, weak points are also produced in systems since algorithms which by now have known weaknesses are still supported.

It is therefore desirable to prevent the use of weak options.

The end nodes involved in authentication and key agreement may themselves use a fixed or configurable guideline or policy for this purpose, for example. In this case, the nodes themselves check which options are permissible. A configuration which is supported by both nodes is negotiated. However, corresponding policies must be set up on a multiplicity of nodes in this case.

This is associated with a large amount of effort, in particular in the case of Internet-of-things application scenarios having a multiplicity of nodes, and entails the risk of incorrect configuration. In particular, nodes may have different input methods and formats for changing configuration settings or may not provide an interface in order to stipulate the permissible options by means of a configurable policy. There is also the risk of a firmware update changing the supported options. The process of setting up a corresponding policy on each individual node is therefore complicated and prone to error.

SUMMARY

An aspect relates to a protocol which is supported by a terminal in a simple manner and to accordingly adapt communication of the terminal.

Accordingly, an apparatus for adapting authorization information for a terminal is proposed. The apparatus has a communication unit for communicating with the terminal, the communication unit being configured to carry out the communication as test communication using an encryption protocol, a checking unit for checking a configuration of the encryption protocol on the terminal, and a control unit for adapting the authorization information for the terminal on the basis of a result of the check.

The respective unit, for example the checking unit or control unit, can be implemented using hardware and/or else software. In the case of a hardware implementation, the respective unit may be designed as an apparatus or as part of an apparatus, for example as a computer or as a microprocessor. In the case of a software implementation, the respective unit can be designed as a computer program product, as a function, as a routine, as part of a program code or as an executable object.

In networks, network intermediate nodes, such as a firewall, are used to enable communication between terminals inside a network system and external network nodes, that is to say network nodes outside the network system. However, in the case of an encrypted connection, these firewalls cannot always check the options negotiated for this connection between the individual devices or end points for this encrypted connection.

The proposed apparatus makes it possible to check the configuration of an encryption protocol, as is intended to be used for communication between one terminal and another terminal, in advance. This means that test communication is carried out by the communication unit before the actual communication takes place. This test communication corresponds to communication using an encryption protocol, as would also be carried out with another external terminal, for example via a firewall.

During this test communication, the checking unit can check which configuration of the encryption protocol is used by the terminal. When setting up or attempting to set up the connection, the terminal being checked transmits an item of information relating to the supported options or the configuration of the encryption protocol. The checking unit can compare this transmitted information with predefined information. For example, the checking unit can check whether or the extent to which the transmitted information matches a predefined policy.

On the basis of a result of this check, the control unit can adapt authorization information for the terminal. In this context, adaptation can comprise both changing and not changing the authorization information. The authorization information may define, inter alia, the types of communication for which the terminal is allowed or the communication partners with which the terminal is allowed to communicate.

In one embodiment, the apparatus may be integrated in a firewall. In this case, the apparatus could set up test communication not only with an internal terminal but also with an external server. This means that the apparatus can carry out a check internally and externally in this embodiment.

According to one embodiment, the encryption protocol is a transport layer security (TLS) protocol or a secure socket layer (SSL) protocol.

TLS and the predecessor SSL are security protocols which are used in the Internet, for example during online shopping or online banking, in order to ensure secure data transmission. These protocols are also used on a multiplicity of industrial field devices, for example diagnostic interfaces or control communication.

According to another embodiment, the control unit is configured to output a warning signal on the basis of the adapted authorization information.

If the checking unit identifies that non-secure or impermissible options of the encryption protocol are supported by the terminal, a warning signal can be output to a system administrator or a central unit, for example. The warning signal may contain information relating to the adapted authorization information and/or relating to the configuration used by the terminal. Further adaptations inside the network, for example even directly on the terminal, can be made on the basis of the warning signal. The terminal can therefore be blocked for external communication, that is to say communication beyond its own network. Furthermore, the configuration of the encryption protocol can be adapted on the terminal in order to comply with a given policy or guideline.

According to another embodiment, the control unit is configured to transmit the adapted authorization information to a firewall apparatus.

On the basis of this, external communication of the terminal can be blocked or at least restricted or enabled, for example, in the firewall apparatus.

According to another embodiment, the communication unit is configured to set up the test communication to the terminal using the encryption protocol.

According to this embodiment, the communication unit can actively set up communication to the terminal. This can be carried out according to a defined rule, for example at particular intervals of time. Alternatively or additionally, the test communication can be set up on request, for example by a firewall.

According to another embodiment, the communication unit is configured to receive an initiation message from the terminal and to set up the test communication to the terminal using the encryption protocol after the initiation message has been received.

According to this embodiment, the terminal itself can initiate a check. This can be carried out, for example, before the terminal would like to set up communication to the outside.

According to another embodiment, the communication unit is configured to set up test communication to a plurality of ports of the terminal using the encryption protocol.

In this case, a plurality of test communications to different ports can be set up. This is advantageous, inter alia, when different TLS implementations or TLS configurations are present on a terminal. All existing configurations can therefore be tested or checked at the same time.

According to another embodiment, the communication unit is configured to conclude the test communication after the check has been concluded.

For the purpose of checking, a TLS connection is set up as the test communication between the terminal and the apparatus in order to determine and test the configuration of the terminal. In contrast to TLS proxies, the apparatus does not remain in the communication path, but rather only sets up the TLS connections in order to check the configuration/implementation of the TLS protocol. The test communication is then concluded again.

According to another embodiment, the communication unit is configured to interrupt communication between the terminal and a server and to carry out the test communication with the terminal.

A connection set-up between the terminal and a target node can be diverted in this case to the apparatus in order to check configuration. This diversion is canceled again only after the check has been concluded.

According to another embodiment, the control unit is configured to enable or abort the communication between the terminal and the server on the basis of the adapted authorization information.

The operation of canceling the diversion can result either in the communication being aborted, both in the case of a positive result and in the case of a negative result of the check, or in communication with the server being enabled and the communication being returned to the latter in the event of a positive result of the check.

According to another embodiment, the configuration of the encryption protocol contains guidelines, cryptographic parameters and/or protocol options.

In this case, the configuration of the encryption protocol can be compared with predefined guidelines or a security policy. Such a security policy may comprise the following points in this case which can be negotiated by a handshake (for example TLS):

Proposed and accepted authentication methods (including prioritization)
When using certificate-based authentication, it is additionally possible
to verify the certificate used (including the certificate path),
to check the key usage fields used in the certificate,
to check the extensions of a certificate which have been used,
Proposed and accepted message integrity protection (including prioritization)
Proposed and accepted message confidentiality (including prioritization)
Quality of cryptographic parameters (keys, public parameters of cryptographic methods, Diffie-Hellman parameters, etc.)
Protocol options for updating a session key.

A network system having at least one terminal and at least one apparatus explained above for adapting the authorization information for the at least one terminal is also proposed.

In addition, a method for adapting authorization information for a terminal is proposed. The method has the following steps of: carrying out communication with the terminal, the communication being carried out as test communication using an encryption protocol, checking a configuration of the encryption protocol on the terminal, and adapting the authorization information for the terminal on the basis of a result of the check.

The embodiments and features described for the proposed apparatus accordingly apply to the proposed method.

A computer program product which causes the method explained above to be carried out on a program-controlled device is also proposed.

A computer program product, for example a computer program means, can be provided or supplied, for example, as a storage medium, such as a memory card, USB stick, CD-ROM, DVD, or else in the form of a downloadable file from a server in a network. This can be effected in a wireless communication network, for example, by transmitting an appropriate file with the computer program product or the computer program means.

Further possible implementations of embodiments of the invention also comprise combinations that are not explicitly mentioned for features or embodiments that are described above or below for the exemplary embodiments. In this case, a person skilled in the art will also add single aspects as improvements or additions to the respective basic form of embodiments of the invention.

BRIEF DESCRIPTION

Some of the embodiments will be described in detail, with reference to the following figures, wherein like designations denote like members, wherein:

FIG. 4 shows another schematic flowchart of an exemplary embodiment of a method for adapting authorization information for a terminal.

DETAILED DESCRIPTION

In the figures, identical or functionally identical elements have been provided with the same reference symbols unless indicated otherwise.

Figure 1:
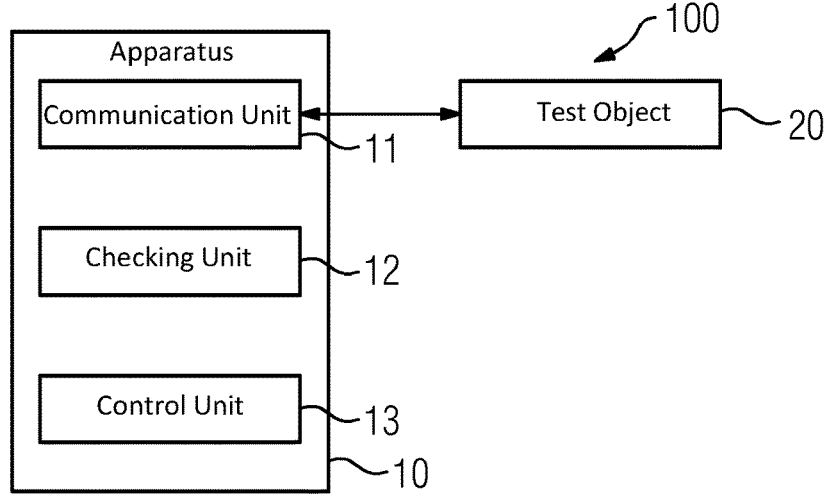
FIG. 1 shows a schematic block view of an exemplary embodiment of an apparatus for adapting authorization information for a terminal.

FIG. 1 shows an apparatus 10 for adapting authorization information for a terminal 20 in a network system 100. The apparatus 10 has a communication unit 11, a checking unit 12 and a control unit 13.

The communication unit 11 communicates with the terminal 20. In this case, test communication is carried out using an encryption protocol.

During the test communication, the checking unit 12 checks the configuration of the encryption protocol present on the terminal 20. In this case, the checking unit 12 can compare this configuration with predefined guidelines or policies which are intended to be complied with.

The control unit 13 can finally adapt authorization information for the terminal 20 on the basis of a result of the check.

The apparatus 10 makes it possible to check configurations of terminals 20, in particular the TLS protocol. For this purpose, a test connection to the test unit is set up. It is therefore possible to easily check the supported options or the configuration. They can also be captured when the authentication, key agreement and negotiation of options are carried out via an encrypted communication connection and therefore cannot be monitored by an intermediate node such as a firewall.

The check by the apparatus 10 can be carried out at any desired times and not only when actually setting up a connection. In addition, there is no need for any specific software component on the component 20 being checked for this purpose since the existing functionality is used directly via the connection set-up. The results of the verification can be used, for example, as part of NAC measures (remediation).

The apparatus 10 can also check special policies. TLS, for example, also implements prioritization using the sequence of the stated cipher suites. This can be tested by the apparatus 10 or the checking unit 12. It is likewise possible to test whether cipher suites which are used for backwards compatibility or have not been explicitly switched off are supported. Such problems are used, for example, at weak points such as Freak or Logjam.

Figure 2:
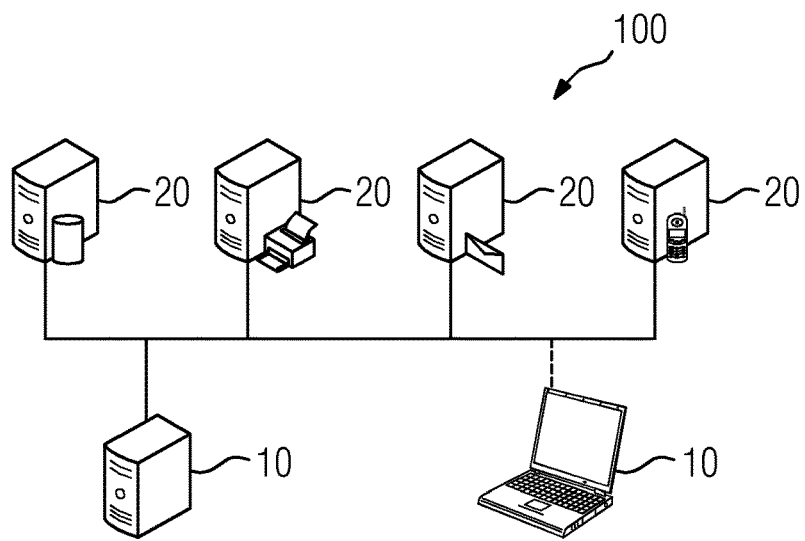
FIG. 2 shows an exemplary embodiment of a network system having two apparatuses for adapting authorization information for a terminal.

FIG. 2 shows an exemplary structure of a network system 100. In this case, a plurality of server components are available as terminals 20 in a network for particular applications. The apparatus 10 may be available as a permanent device or else temporarily as a mobile device in the network 100.

In this case, the apparatus 10 is configured using the local security policy of the network 100. It can derive this from the engineering data, for example in the case of an industrial installation. In an office network, corresponding policies can be queried using a group policy server in a domain.

In another configuration, the apparatus 10 can also be a functionality of a policy enforcement server in the network 100. Depending on the compliance with a security policy, the apparatus 10 can dynamically reconfigure the infrastructure component closest to the test object 20, for example a switch or router, in order to make it possible to convert the policy of the test object 20. For this purpose, the test object 20 can be moved, for example, to a separate VLAN (virtual local area network), as is known from the NAC (network access control, also network admission control) approaches. In networks which are configured using software defined networking (SDN), this shift can be carried out by the SDN controller.

On the basis of this security policy, the apparatus 10 now sets up a TLS connection or a corresponding different security protocol used in order to query the security policies of the server component 20 being tested as part of the protocol handshake and to compare them with the present policy.

Figure 3:
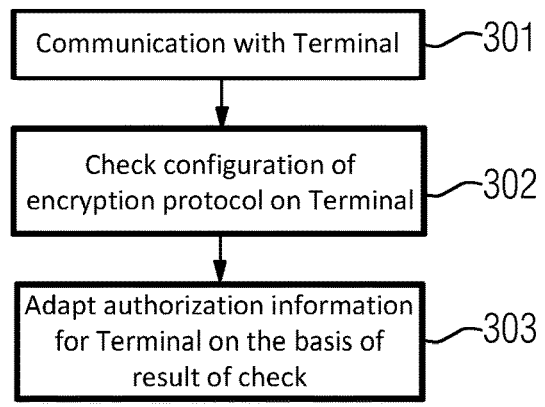
FIG. 3 shows a schematic flowchart of an exemplary embodiment of a method for adapting authorization information for a terminal.

FIG. 3 shows a method for adapting authorization information for a terminal 20. The method has the steps 301 to 303.

In step 301, communication with the terminal 20 is carried out, communication being carried out as test communication using an encryption protocol.

In step 302, the configuration of the encryption protocol on the terminal 20 is checked.

In step 303, the authorization information for the terminal 20 is finally adapted on the basis of a result of the check.

FIG. 4 shows an exemplary detailed sequence of the method for adapting the authorization information.

In step 401, the apparatus 10 is started.

In step 402, the security policy of the network 100 is first of all queried.

In step 403, the terminal 20 is started and an initial message is transmitted to it in step 404.

The configuration is checked here in two steps.

First of all, a message is received from the terminal 20 in step 405. This message is checked for a protocol version used, a cipher suite or other protocol features.

Step 406 determines whether the determined information corresponds to the security policy of the network 100. If this is not the case, the method continues with step 407 in which an alarm signal is output, for example.

If the determined information corresponds to the security policy of the network 100, the method continues with step 408 and now checks the TLS handshake messages. These can be checked for Diffie-Hellman parameters, for example.

Step 409 now again determines whether the determined information corresponds to the security policy of the network 100. If this is not the case, the method continues with step 407.

If the determined information corresponds to the security policy of the network 100, the method continues with step 410 and adapts the authorization information for the terminal 20.

The adaptation in step 410 is also carried out after a warning signal has been output in step 407.

The method ends in step 411.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An apparatus for changing authorization information for a terminal, the apparatus comprising:
a hardware communication unit configured to transmit a test communication using an encryption protocol to the terminal before a communication between the terminal and second terminal or during a communication between the terminal and a second terminal by interrupting the communication between the terminal and the second terminal, such that in response to the test communication, the terminal transmits an item of information relating to the supported encryption protocol options or a configuration of the encryption protocol that will be used by the terminal to communicate with the second terminal, or that the terminal is currently using to communicate with the second terminal;
a hardware checking unit configured to receive from the terminal the item of information relating to the supported encryption protocol options or the configuration of the encryption protocol on the terminal that will be use by the terminal to communicate with the second terminal, or that the terminal is currently using to communicate with the second terminal,
wherein, during the test communication, the hardware checking unit is further configured to perform a comparison of the item of information relating to the supported encryption protocol options or the configuration of the encryption protocol on the terminal that will be use by the terminal to communicate with the second terminal, or that the terminal is currently using to communicate with the second terminal, with predefined permissible and impermissible encryption protocol options according to a predefined security policy; and
a hardware control unit configured to change at least one of types of communication for which the terminal is allowed, communication partners with which the terminal is allowed to communicate, and configuration of the encryption protocol used by the terminal, based on whether the item of information relating to the supported options or the configuration of the encryption protocol on the terminal includes permissible or impermissible encryption protocol options of the predefined security policy, and block, restrict, abort, or enable communication between the terminal and the second terminal based on the change,
wherein the apparatus is configured to exit the communication path with the terminal after blocking, restricting, aborting, or enabling the communication between the terminal and the second terminal.

2. The apparatus as claimed in claim 1, wherein the encryption protocol is a transport layer security protocol or a secure socket layer protocol.

3. The apparatus as claimed in claim 1, wherein the hardware control unit is configured to output a warning signal when a configuration of the encryption protocol on the terminal is identified by the apparatus as being a predefined impermissible encryption protocol option, during the test communication.

4. The apparatus as claimed in claim 1, wherein the second terminal is external to a network of the terminal, and wherein the hardware control unit is configured to transmit the changed at least one of types of communication for which the terminal is allowed, communication partners with which the terminal is allowed to communicate, and configuration of the encryption protocol used by the terminal to a firewall apparatus such that the firewall apparatus blocks, restricts, or enables communication between the terminal and the second terminal based on the at least one of types of communication for which the terminal is allowed, communication partners with which the terminal is allowed to communicate, and configuration of the encryption protocol used by the terminal based on a result of the comparison.

5. The apparatus as claimed in claim 1, wherein the hardware communication unit is configured to set up the test communication to the terminal using the encryption protocol.

6. The apparatus as claimed in claim 5, wherein the hardware communication unit is configured to receive an initiation message from the terminal and to set up the test communication to the terminal using the encryption protocol after the initiation message has been received.

7. The apparatus as claimed in claim 5, wherein the hardware communication unit is configured to set up the test communication to a plurality of ports of the terminal using the encryption protocol.

8. The apparatus as claimed in claim 1, wherein the hardware communication unit is configured to conclude the test communication after the check has been concluded.

9. The apparatus as claimed in claim 1, wherein the configuration of the encryption protocol contains guidelines, cryptographic parameters and/or protocol options.

10. A network system comprising:
at least one terminal; and
at least one apparatus as claimed in claim 1, wherein the predefined security policy defines security policy of the network system.

11. The apparatus for adapting authorization information for a terminal of claim 1, wherein the hardware checking unit is configured to determine, based on the configuration of the encryption protocol used by the terminal, whether cipher suites which are used for backwards compatibility are supported by the terminal, and wherein the change prevents cipher suites which are used for backwards compatibility being used by the terminal.

12. The apparatus for adapting authorization information for a terminal of claim 1, wherein the predefined impermissible encryption protocol options include non-secure configuration of the encryption protocol used by the terminal according to the predefined security policy.

13. The apparatus for adapting authorization information for a terminal of claim 1, wherein the apparatus is configured to determine the predefined permissible and impermissible encryption protocol options before transmitting the test communication to the terminal, wherein the predefined permissible and impermissible encryption protocol options of the encryption protocol include accepted authentication methods, accepted message integrity protections, accepted message confidentiality, and accepted cryptographic parameters.

14. A method for changing authorization information for a terminal, comprising:

transmitting a test communication to the terminal using an encryption protocol before a communication between the terminal and second terminal or during a communication between the terminal and a second terminal by interrupting the communication between the terminal and the second terminal;

receiving, in response to the test communication, from the terminal an item of information relating to the supported encryption protocol options or a configuration of the encryption protocol that will be used by the terminal to communicate with the second terminal, or that the terminal is currently using to communicate with the second terminal;

performing a comparison during the test communication of the item of information relating to the supported encryption protocol options or the configuration of the encryption protocol that will be used by the terminal to communicate with the second terminal, or that the terminal is currently using to communicate with the second terminal with predefined permissible and impermissible options of the encryption protocol according to a predefined security policy for communication between the terminal and the second terminal;

changing at least one of types of communication for which the terminal is allowed, communication partners with which the terminal is allowed to communicate, and the configuration of the encryption protocol used by the terminal, based on whether the item of information relating to the supported options or the configuration of the encryption protocol on the terminal includes permissible or impermissible options of the encryption protocol according to the predefined security policy, blocking, restricting, aborting, or enabling; and enabling or aborting a communication between the terminal and the second terminal based on the change; and exiting the communication path with the terminal after blocking, restricting, aborting, or enabling the communication between the terminal and the second terminal.

15. A computer program product which causes the method as claimed in claim 13 to be carried out on a program-controlled device.

16. The method for adapting authorization information for a terminal of claim 14, wherein the method includes determining, based on the configuration of the encryption protocol used by the terminal, whether cipher suites which are used for backwards compatibility are supported by the terminal, and performing the changing such that cipher suites which are used for backwards compatibility cannot be used by the terminal.

17. The method for adapting authorization information for a terminal of claim 14, wherein the predefined impermissible encryption protocol options include non-secure configuration of the encryption protocol used by the terminal according to the predefined security policy.

18. The method for adapting authorization information for a terminal of claim 14, including determining the predefined permissible and impermissible options of the encryption protocol before transmitting the test communication to the terminal, wherein the predefined permissible and impermissible options of the encryption protocol include accepted authentication methods, accepted message integrity protections, accepted message confidentiality, and accepted cryptographic parameters.

19. An apparatus for changing authorization information for a terminal, the apparatus comprising:

a hardware communication unit configured to interrupt a communication between the terminal and a second terminal such that a connection between the terminal and second terminal is diverted to the apparatus, wherein the hardware communication unit is configured to transmit a test communication using an encryption protocol to the terminal after the connection is diverted to the apparatus, such that the terminal transmits information about the configuration of the encryption protocol used by the terminal to the apparatus;

a hardware checking unit configured to receive from the terminal the configuration of the encryption protocol on the terminal, and perform a comparison of the configuration of the encryption protocol used by the terminal with predefined permissible and impermissible encryption protocol options according to a predefined security policy during the test communication; and a hardware control unit configured to change at least one of types of communication for which the terminal is allowed, communication partners with which the terminal is allowed to communicate, and configuration of the encryption protocol used by the terminal, based on whether the item of information relating to the supported options or the configuration of the encryption protocol on the terminal includes permissible or impermissible options of the predefined security policy, wherein the hardware control unit is configured to enable the communication between the terminal and second terminal based on the change of the at least one of types of communication for which the terminal is allowed, communication partners with which the terminal is allowed to communicate, and configuration of the encryption protocol used by the terminal based on a result of the comparison when the hardware checking unit identifies that permissible options are supported by the terminal, and wherein the hardware control unit is configured to abort the communication between the terminal and the second terminal based on the change of the at least one of types of communication for which the terminal is allowed, communication partners with which the terminal is allowed to communicate, and configuration of the encryption protocol used by the terminal based on a result of the comparison when the hardware checking unit identifies that impermissible options are supported by the terminal, wherein the apparatus is configured to exit the communication path with the terminal after enabling or aborting the communication between the terminal and the second terminal.

\* \* \* \* \*